H. GARRISON.
PNEUMATIC ATTACHMENT FOR VEHICLE WHEELS.
APPLICATION FILED FEB. 13, 1911.

1,016,558.

Patented Feb. 6, 1912.

3 SHEETS—SHEET 1.

Witnesses:
Chas. E. Gorton,
E. Newstrom.

Inventor:
Herman Garrison,
By Chas. C. Tillman
Atty.

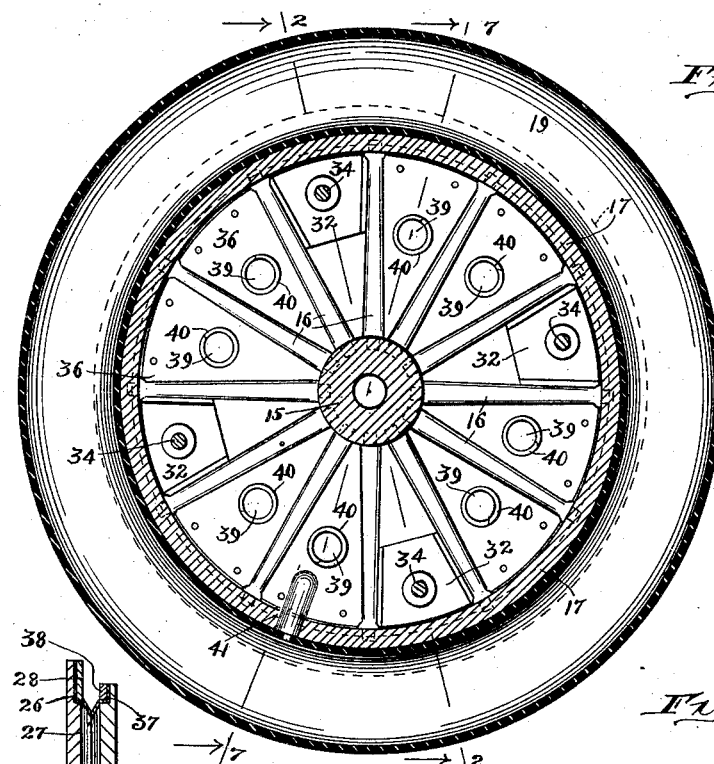
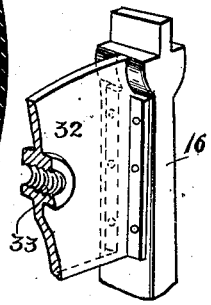
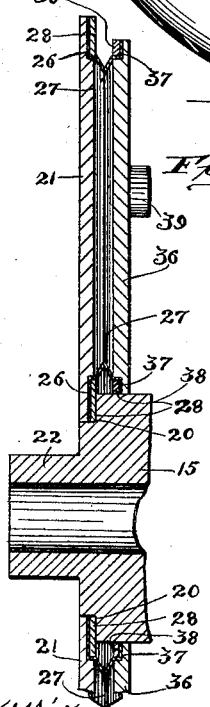
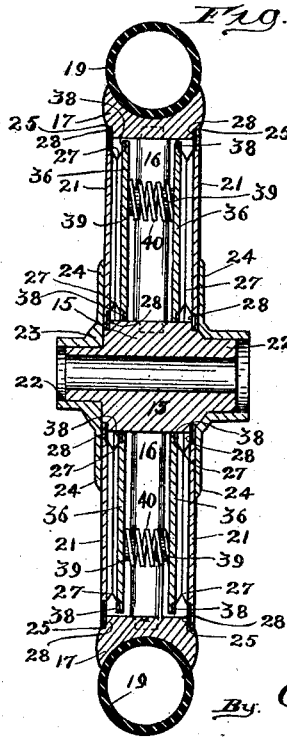
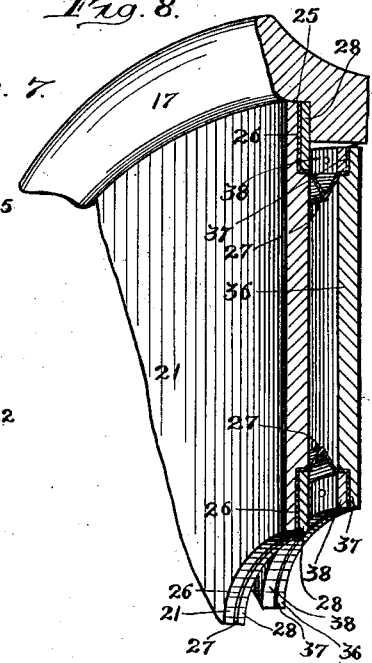

H. GARRISON.
PNEUMATIC ATTACHMENT FOR VEHICLE WHEELS.
APPLICATION FILED FEB. 13, 1911.
1,016,558.
Patented Feb. 6, 1912.
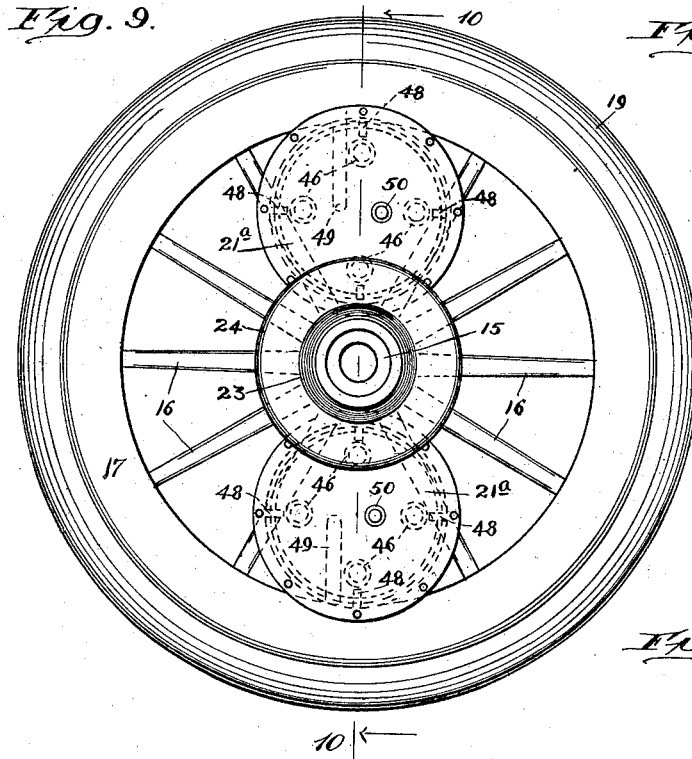
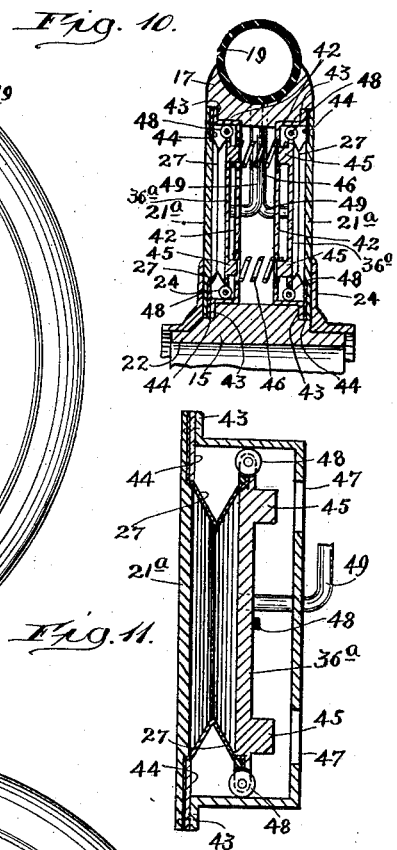
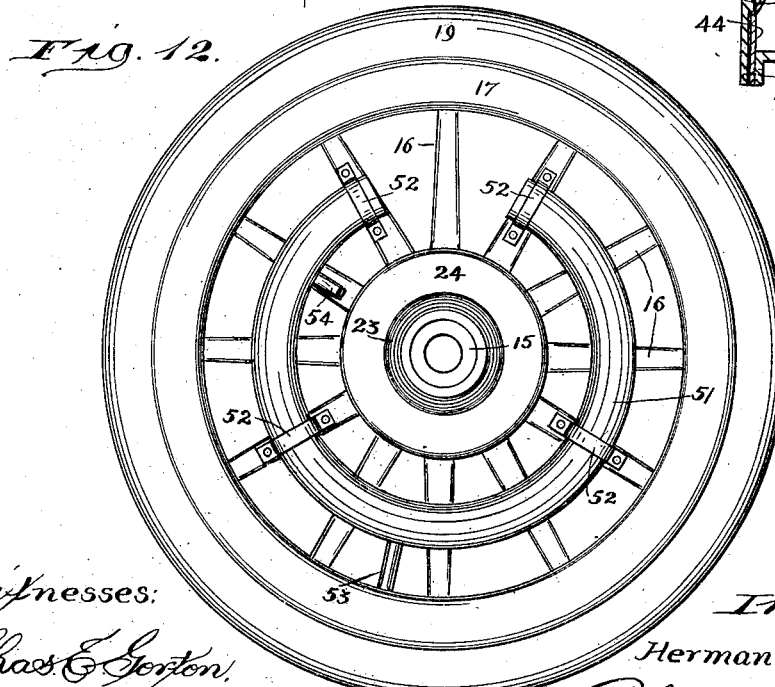
Witnesses:
Chas. E. Gorton,
E. Newstrom.
Inventor:
Herman Garrison,
By Chas. O. Tillman
Atty

UNITED STATES PATENT OFFICE.

HERMAN GARRISON, OF CHICAGO, ILLINOIS.

PNEUMATIC ATTACHMENT FOR VEHICLE-WHEELS.

1,016,558. Specification of Letters Patent. Patented Feb. 6, 1912.

Application filed February 13, 1911. Serial No. 608,293.

*To all whom it may concern:*

Be it known that I, HERMAN GARRISON, a citizen of the United States, residing at Chicago, in the county of Cook and State of Illinois, have invented certain new and useful Improvements in Pneumatic Attachments for Vehicle-Wheels, of which the following is a specification.

This invention relates to improvements in means to be applied to the wheels of various kinds of vehicles, but more particularly to those used on motor-driven ones and bicycles, for the purpose of furnishing resiliency to the tires thereof, and it consists in certain peculiarities of the construction, novel combination, arrangement and operation of the various parts thereof as will be hereinafter fully set forth and specifically claimed.

The principal object of the invention is to provide simple, efficient, and durable means for imparting resilience to pneumatic tires composed of substantially or relatively inelastic material, so that the same results may be obtained by the use of pneumatic tires made of inexpensive material, such as rubber compounds, fiber, and the like, as is afforded by the employment of high grade tires or those made of pure rubber or costly material, to the end, that, great economy in the manufacture and use of pneumatic tires may be effected.

Another object of the invention is to provide compensating means for reducing or absorbing shocks incident to the passage of the tires of the wheels over obstructions or uneven surfaces.

Other objects and advantages of the invention will be disclosed in the subjoined description and explanation.

In order to enable others skilled in the art to which the invention pertains, to make and use the same I will now proceed to describe it, referring to the accompanying drawings, which serve to illustrate an embodiment of the invention and in which—

Figure 1:
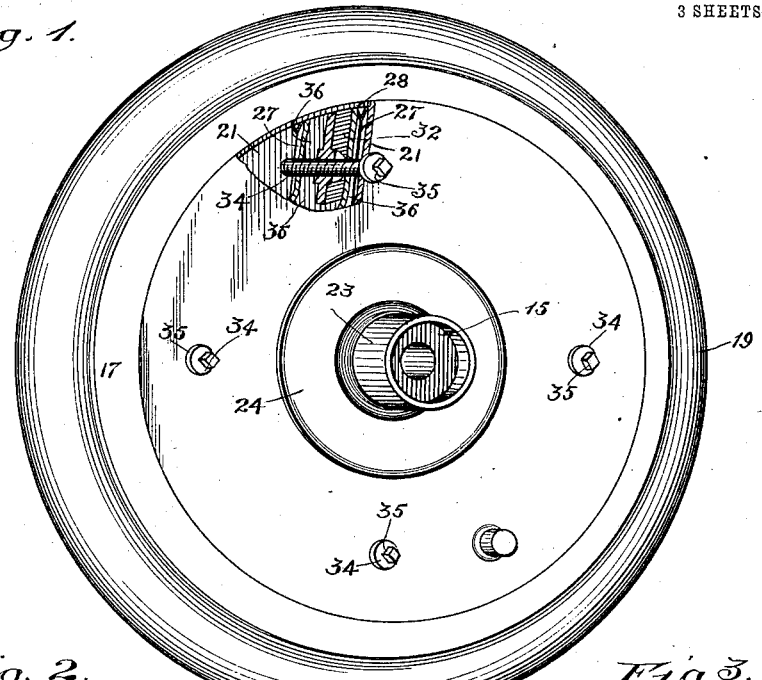
Figure 2:
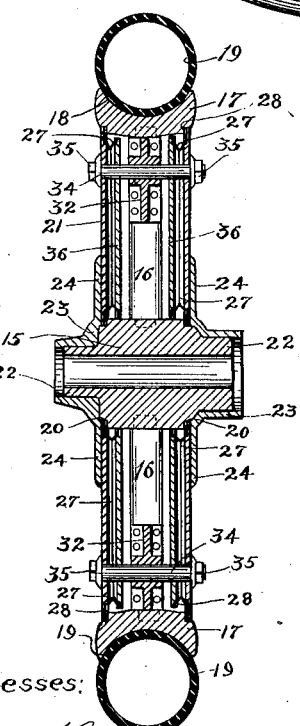
Figure 3:
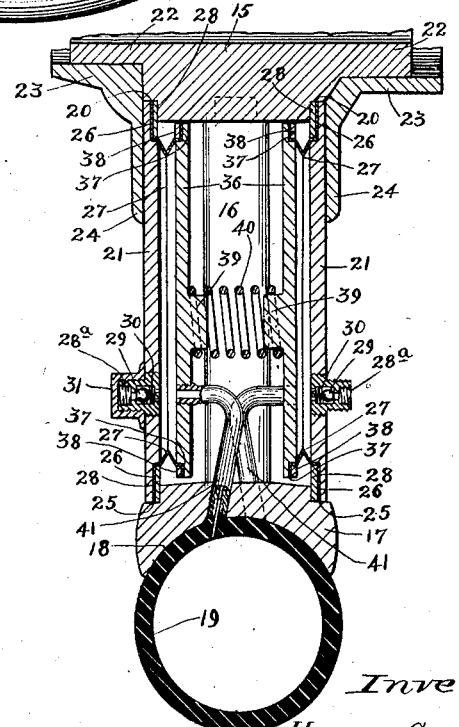

Figure 1, is a perspective view partly in section of a vehicle wheel showing a pneumatic attachment embodying one form of the invention applied thereto. Fig. 2, is a central sectional view through the wheel and attachment taken on line 2—2, of Fig. 4, looking in the direction indicated by the arrows. Fig. 3, is an enlarged transverse sectional view of the lower portion of the wheel and attachment therefor. Fig. 4, is a sectional view taken circumferentially with respect to the wheel, but showing parts in elevation. Fig. 5, is an enlarged detached perspective view of a portion of one of the spokes of the wheel and a part of one of the retaining plates for the bolts used in securing the outer plates of the pneumatics or pneumatic chambers together and to the wheel. Fig. 6, is a slightly enlarged sectional view of a portion of the hub of the wheel and a part of one of the pneumatics or pneumatic chambers showing means for connecting the movable disk or diaphragm to the rigid plate or member thereof. Fig. 7, is a sectional view taken on line 7—7, of Fig. 4, looking in the direction indicated by the arrows. Fig. 8, is an enlarged fragmental perspective view of a part of one of the pneumatics or pneumatic chambers and a portion of the felly of the wheel showing the manner of connecting the pneumatic thereto. Fig. 9, is a view in side elevation of the wheel showing a modified form of the pneumatic attachment applied thereto. Fig. 10, is a sectional view taken on the upper portion of line 10—10, of Fig. 9, looking in the direction indicated by the arrows. Fig. 11, is an enlarged sectional view of one of the pneumatics of the modified form shown in Figs. 9, and 10, and its casing, and Fig. 12, is a view in side elevation of a wheel showing another modification in the construction of the pneumatic attachment therefor.

Corresponding numerals of reference refer to like parts throughout the different views of the drawings.

The reference numeral 15, designates the hub of the wheel which has radiating therefrom a series of spokes 16, which have secured on their outer ends in any suitable manner a felly 17, of any well known construction which is preferably provided with a groove 18, in its periphery to receive the inner portion of a pneumatic tire 19, which may be made of any suitable material, but by preference, of substantially or relatively inelastic material such as low grade rubber, rubber compounds, fiber, or the like. This tire may be frictionally held on the felly 17, or otherwise secured thereto. The hub 15, is provided on each side of the series of spokes 16, with a circumferential recess 20, to receive the inner portions of the outer disks or plates 21, of the pneumatics or pneumatic chambers with which the wheel is equipped. Outwardly from each of the recesses 20, the hub is provided with a reduced portion 22, around which reduced portions are located fittings or caps 23, which have flanges 24, abutting against the outer surfaces of the plates 21, and said fittings and flanges may be secured to the hub and said plates in any desired manner. The outer periphery of each of the plates 21, is fitted in a suitable recess 25, located on the inner portion of the felly 17, at each side of the spokes 16, and at some distance from the same. As is clearly shown in Figs. 3, 6 and 8, of the drawings, each of the plates or disks 21, has on its inner surface at its inner and outer peripheries a circumferential recess 26, to receive a portion of a flexible piece 27, such as leather or other suitable material, which extends around and alongside of the inner portion of each of the plates or disks 21, and may be clamped or secured to said disks by means of a circular plate 28, which are located at one of their edges in the recesses 25, of the wheel rim or felly 17, and at their other edges in the recesses 26, of the plates or disks 21, each of which plates is provided with a nipple 28$^a$, extended therethrough, each having a check valve 29, held in its seated position by means of a spring 30, located in each of the chambers for said valves. Each of the nipples 29, may be closed by means of a cap 31, screwed thereon or when desired said caps may be removed so that an air pump may be attached to the nipples for supplying compressed air to the pneumatics and tire.

Located between the spokes 16, and secured thereto at their edges are a series of retaining plates 32, each of which has an opening 33, which are preferably screw-threaded to receive bolts 34, which are extended through suitable openings in the plates 21, near the outer peripheries thereof, and have on each of their ends a nut 35, to press against the outer surfaces of said plates so as to firmly hold them in position on the hub and rim of the wheel.

Located inwardly of each of the plates 21, and loosely between the hub 15, and the rim 17, is a movable diaphragm or disk 36, each of which preferably has on its outer surface at its inner and outer peripheries a recess 37, see Figs. 6 and 8, to receive the other edges of the flexible pieces 27, which edges may be secured thereon by means of bands 38, located in the recesses 37, of the diaphragms 36, and secured thereto in any suitable manner. Each of the diaphragms 36, is provided on its inner surface with a series of projections 39, said projections on one of the diaphragms 36, being arranged to aline with the similar projections on the other diaphragm. These projections are for the purpose of holding tension springs 40, in place between the diaphragms 36, as will be readily understood by reference to Figs. 3, 6, and 7, of the drawings. Communicating at one of their ends with the cavity of the tire 19, and extended through suitable openings in the rim 17, are tubes 41, which are by preference flexible, and have their other ends communicating with the pneumatic chambers formed by the plates 21, diaphragms 36, and flexible connections 27, therefor.

Instead of employing a single pneumatic or pneumatic chamber encircling the hub of the wheel on each side of the spokes as shown in Figs. 1 to 8, inclusive, and above described, a plurality of smaller pneumatics on each side of the spokes of the wheel, and between the hub thereof and its rim, but not encircling the hub as is shown in Figs. 9 to 11 inclusive, and will now be described, may be employed. In the modification now under consideration, I have shown the wheel equipped with two cylindrical or cuplike casings 42, located diametrically opposite each other on each side of the spokes of the wheel. Each of the casings 42, has on its outer portion an annular flange 43, which are of sufficient size to reach from the hub 15, to the rim 17, and are secured to said parts by rivets or otherwise. Located on the outer surface of each of the flanges 43, of each of the casings 42, is an annular plate 44, on the outer surface of each of which a portion of a flexible piece of material such as leather 27, is located and held in position thereon by means of an outer plate 21$^a$, of the pneumatic, which plates may be secured to the flanges 43, plates 44, and material 27, by means of rivets or otherwise. Movably located in each of the casings 42, is a diaphragm or disk 36$^a$, which has connected to the inner surface of its periphery the edge of the flexible piece 27, opposite that which is connected to the rigidly held plate 21$^a$, of the pneumatic. It will be understood that in each of the pneumatics now being described, as well as those shown in Figs. 1 to 8 inclusive, and above described, the flexible pieces 27, are circumferentially disposed with respect to the rigid and movable plates or disks of each pneumatic. Each of the disks or diaphragms 36$^a$, is provided on its surface adjacent to the spokes of the wheel with projections 45, around which the ends of springs 46, rest, which springs are extended through openings 47, in the inner walls of the casings 42, as will be readily understood by reference to Figs. 10 and 11, of the drawings. Each of the disks 36$^a$, has journaled on its outer portion a series of rollers 48, which contact with the circular walls of the casings 42, and are employed to permit of the free lateral movement of said disks but to prevent any movement thereof either toward or from the hub of the wheel. Communicating at one of its ends with each of the pneumatics is a flexible tube 49, which has its other end extended through the rim 17, and in communication with the tire 19. Each of the outer plates 21ª, may be provided with a nipple 50, of the same construction as the nipples 28ª, above described, and employed for the same purpose.

In Fig. 12, is shown another modification in the construction of the attachment which consists in employing a pneumatic or pneumatic chamber 51, which may be made of rubber or other elastic or expansible material, and is shown in the form of a broken ring, which pneumatic is mounted on one side of the spokes of the wheel and may be held in place thereon by means of straps 52, extended over and across the pneumatic and having their ends fastened by means of rivets to the spokes. Communicating at one of its ends with the pneumatic 51, and extended through the rim 17, and communicating at its other end with the cavity of the tire 19, is a tube 53, which may be flexible if desired, and will permit air under pressure to pass from the pneumatic to the tire or vice versa. The pneumatic 51, may be provided with a valved nipple 54, of similar construction to the valve nipple 28ª, shown in Fig. 3, and above described, for the purpose of permitting air to be forced into the pneumatic and from thence into the tire.

From the foregoing and by reference to the drawings it will be readily understood and clearly seen, that, in using any of the constructions shown and above described, when the tire meets with any obstruction which will tend to diminish its volume the pressure will be transmitted to the expansible pneumatic or pneumatics, and its or their expansion will permit the tire to yield the same as if it were composed of elastic material. Conversely, with the removal of the obstruction, the tension of the expansible pneumatics will force air back into the tire, thus permitting the requisite change of form and volume in the tire to adjust itself to inequalities of the surface over which it travels.

By employing an attachment constructed according to my invention, it is apparent that inexpensive material may be used for the construction of the tires, which when worn out, can be replaced at less expense than pure rubber tires, and that as the expansible pneumatics are so located on the wheel as to be protected from exposure to wear and tear, they will last indefinitely.

As compared with the various pneumatic tires which are being developed as a substitute for high grade rubber tires, it is apparent that this attachment will permit of the requisite change of form and volume in the tire to adjust itself to inequalities of surface, whereas, an inelastic tire not connected with an expansible pneumatic or air chamber, cannot undergo a diminution in volume without sudden compression of the air, the compressibility of which is not sufficient to meet the requirements.

From the above description, it will be understood that the improved pneumatic attachment for vehicle wheels, constructed according to the invention, is susceptible of considerable modification without material departure from the principles and spirit of the invention, and for this reason I do not desire to be understood as limiting myself to the exact form and arrangement of the several parts herein set forth, in carrying out the invention in practice.

Having thus fully described my invention, what I claim as new and desire to secure by Letters Patent is—

1. An attachment of the character described consisting of a pneumatic tire of the ordinary construction fitted to the rim of the wheel, and an expansible pneumatic mounted on the wheel in communication with said tire and between the hub and rim of the wheel, said pneumatic comprising a pair of spaced apart plates, a flexible construction extending between the respective edges of said plates, and means to press one of said plates toward the other.

2. An attachment of the character described consisting of a pneumatic tire of the ordinary construction fitted to the rim of a wheel, and an expansible pneumatic in communication with said tire, said pneumatic consisting of a pair of spaced apart plates mounted on the wheel and approximately parallel to the plane of the rim, means flexibly connecting said plates at their edges, and means to press one of said plates toward the other.

3. An attachment of the character described consisting of a pneumatic tire applied to the rim of a wheel, and an expansible pneumatic mounted on the wheel in communication with said tire and between the hub and rim of the wheel, said pneumatic comprising a pair of spaced apart plates, means flexibly connecting said plates at their edges, and means to press one of said plates toward the other.

4. An attachment of the character described consisting of a pneumatic tire applied to the rim of a wheel, and an expansible pneumatic mounted on the wheel in communication with said tire and between the hub and rim of the wheel, said pneumatic comprising a circular plate having a central opening to receive and engage the hub of the wheel and secured at its outer portion to the rim of the wheel, a movable tension disk located on one side of said plate, and means flexibly connecting said plate and disk at their outer and inner portions thereby forming an air chamber.

5. An attachment of the character described consisting of a pneumatic tire applied to the rim of a wheel, and an expansible pneumatic mounted on the wheel in communication with said tire and between the hub and rim of the wheel, said pneumatic comprising a circular plate having a central opening to receive and engage the hub of the wheel and secured at its outer portion to the rim of the wheel, a spring pressed movable disk located on one side of said plate, means flexibly connecting said plate and disk at their outer and inner portions thereby forming an air chamber, and a valved nipple communicating with said chamber.

HERMAN GARRISON.

Witnesses:
CHAS. C. TILLMAN,
E. NEWSTROM.

Copies of this patent may be obtained for five cents each, by addressing the "Commissioner of Patents, Washington, D. C."